INVENTOR:
Wm. D. STEADMAN
PER:
Leon Arthurs
Agent

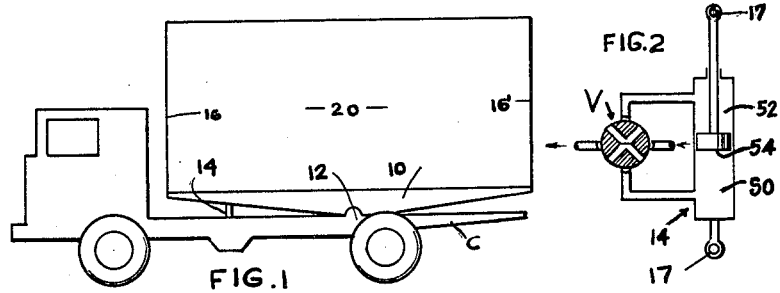
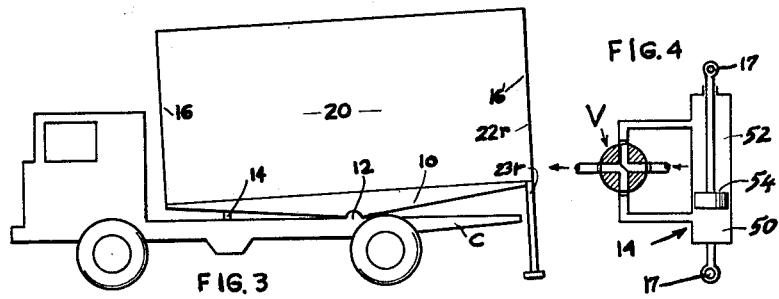
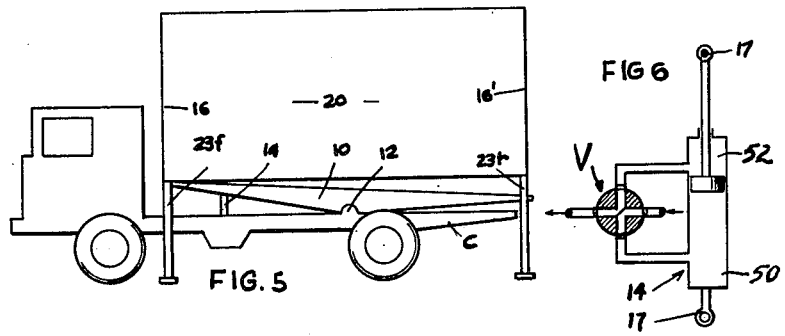
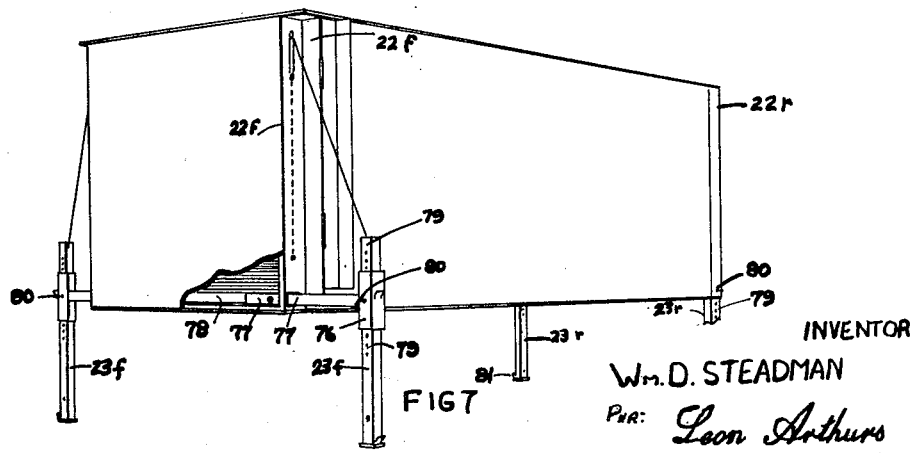

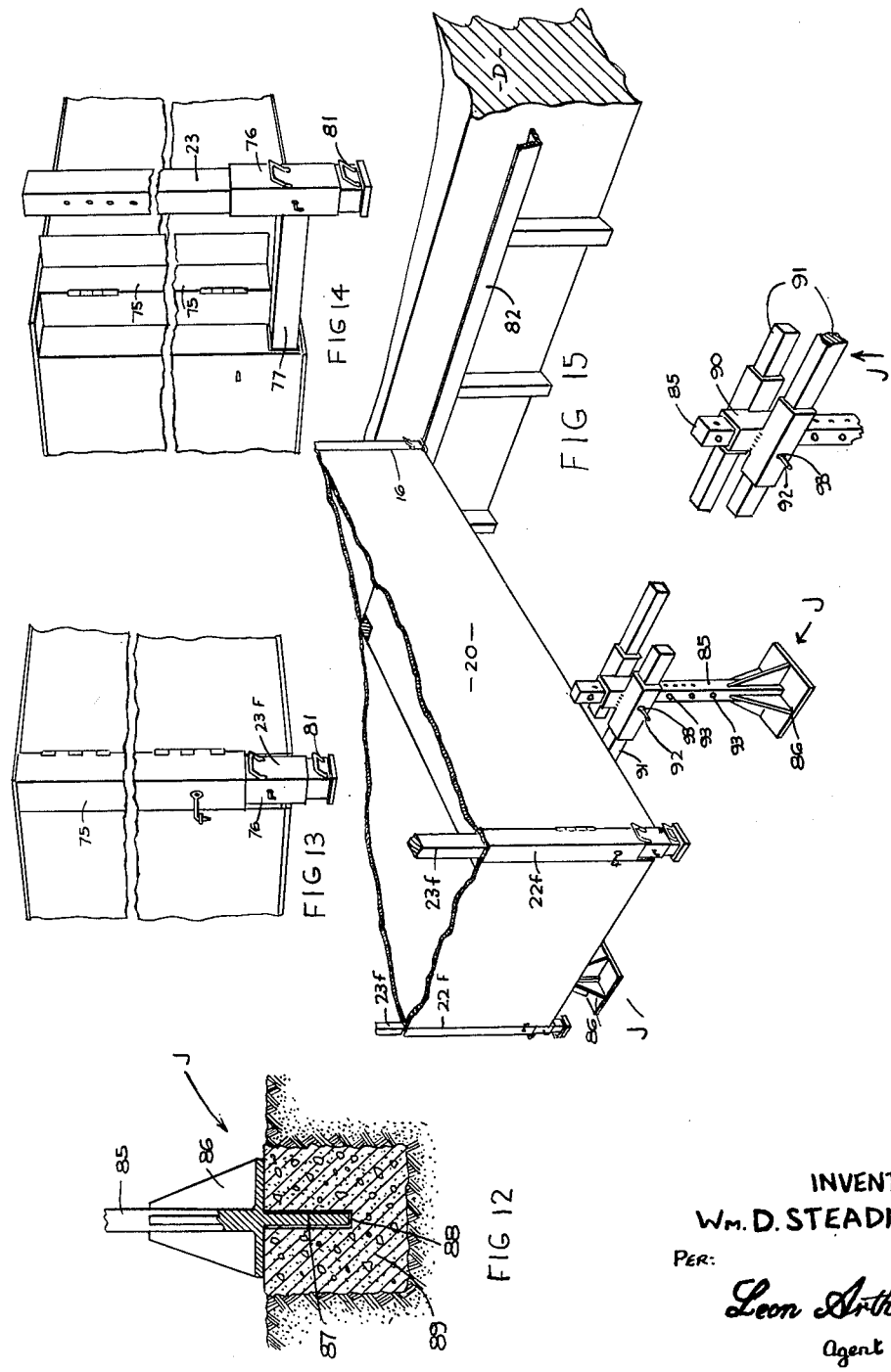

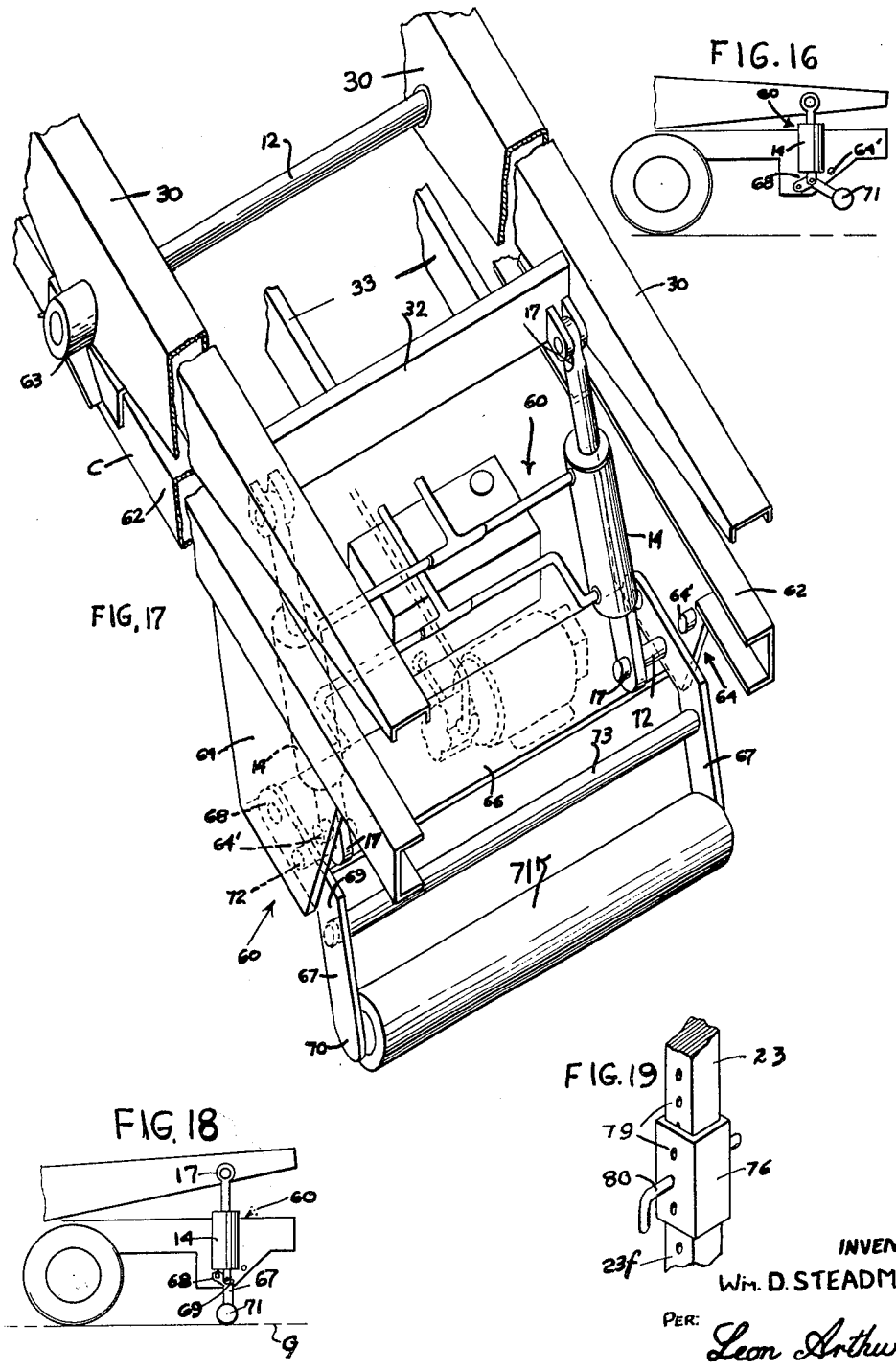

United States Patent Office 3,173,562
Patented Mar. 16, 1965

3,173,562
SYSTEMS FOR TRANSFERRING DEMOUNTABLE FREIGHT CONTAINERS BETWEEN MOVABLE VEHICLES AND EXTERNAL SUPPORTS
William David Steadman, Oakville, Ontario, Canada, assignor, by mesne assignments, to General American Transportation Corporation, Chicago, Ill., a corporation of New York
Filed Oct. 30, 1961, Ser. No. 148,587
8 Claims. (Cl. 214—515)

The present invention relates to systems for transferring demountable freight containers onto or off running gears, such as movable vehicles, that are used and adapted for transporting said containers from place to place.

The running gear specifically contemplated herein may, for example, be constituted by a truck chassis and the freight container by a truck body such as a van demountably mountable on said chassis and transportable thereby.

The utility of trucks with mountably demountable (or transferable) containers is now well recognized. That is to say by demounting and leaving a container at a loading (or unloading) site, the running gear and its driver are thus liberated to engage or be employed in other remunerative activities until such time as the said container is loaded (or unloaded) and hence ready to be retrieved and transported to another site.

It will, therefore, be obvious that the ease or difficulty of transferring such containers may well be an important factor in the feasibility and general economics of moving goods by equipment as herein visualized and it is upon these considerations that the invention accordingly has the broad objective of providing a new and improved concept or method and improved means for transferring containers from or onto running gear.

More specifically, the invention seeks to provide improvements in the running gear as well as in the containers facilitating and expediting such transfer.

It is a still further objective of the invention to provide structure adapted to support the container safely and firmly while it is being transported and to co-operate as well in the transfer thereof at the loading site.

It is also a further object of the invention to provide said structure with provisions for releasably interlocking the container and the running gear when required, as, for example, in transit.

A yet further object of the invention is to provide a chassis equipped with container supporting and transferring means arranged and organized to obviate the necessity for heavy duty construction thereof and further to permit operation thereof by relatively light weight mechanisms.

It is, of course, a most important object of the invention to provide equipment of the character described with improved maneuverability, versatility, efficiency and reliability in use.

It is also an object hereof to provide improved mechanism for operating the present equipment.

The invention achieves its objectives by providing a chassis with a container platform mounted thereon for tilting both forwardly and rearwardly about a transverse axis and with mechanism controllable to tilt said platform in either direction on said axis. Said invention also visualizes a container equipped with built-in, retractable, stilts or legs upon which the container may be supported at a loading site as well as alternative supports therefor at a loading site.

The foregoing and other objectives of the invention in part obvious and in part specifically detailed herein will become apparent from the hereinafter following description of the elements, parts and principles constituting the invention whereof a selected embodiment is illustrated by way of example only in the hereunto annexed drawing wherein like devices of reference denote like parts of the invention through the several views and wherein:

FIGS. 1, 3 and 5 are schematic views illustrating the general organization of the parts of the invention and also progressively illustrating the manner of its use.

FIGS. 2, 4 and 6 are schematic views of a cylinder constituting the mechanism for tilting the container platform aforesaid and a valve for controlling said cylinder; the respective views showing the different conditions of the valve and cylinder corresponding to the various positions of the said platform represented in FIGS. 1, 3 and 5.

FIG. 7 is a generally schematic isometric view of an instant freight container having broken out portions disclosing structural details of the front legs.

FIG. 12 is an elevational view of an element of the invention, partly sectioned.

FIG. 13 is an enlarged elevational view of the lower portion of a front leg of the instant freight container.

FIG. 14 is a view of the detail shown in FIG. 13 at a stage in the operation thereof.

FIG. 15 is an isometric and broken view of an instant container at a loading site showing various modified elements of the invention.

FIG. 16 is a schematic view of a modification of the invention at a stage in the functioning thereof.

FIG. 17 is an isometric view of the rear ends of the instant platform and chassis showing an alternative mechanism for tilting the platform.

FIG. 18 is a schematic view similar and corresponding to FIG. 16 and showing the modification of FIG. 17 at a different functional stage; and FIG. 19 is an enlarged elevational view of a leg detail.

Figure 8:
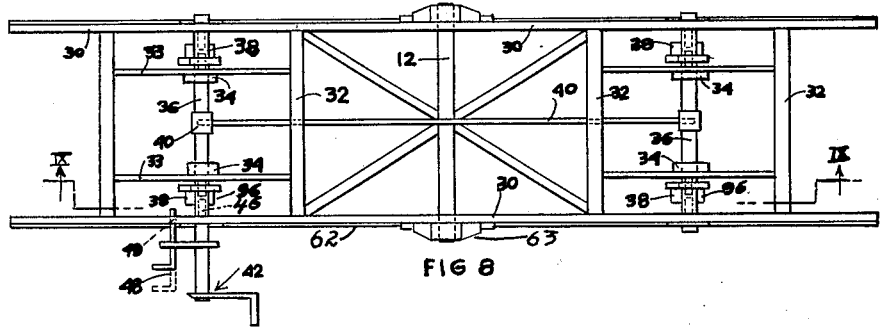
FIG. 8 is a top plan view in more or less schematic form of the instant platform and chassis; the undercarriage or specific running gear of the latter having been omitted.
Figure 9:
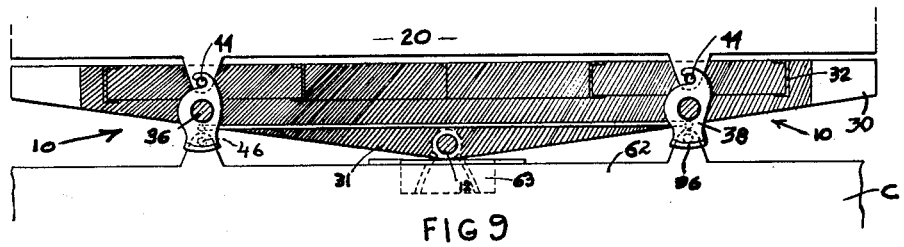
FIG. 9 is a section along lines IX—IX of FIG. 8 providing a side elevational view of the structure of FIG. 8.

Basically, the present inventive ideas are directed towards a vehicle comprising container platform 10 superimposed and mounted on chassis C for rocking about fulcrum 12 which is transverse to the longitudinal axis of said chassis C.

Hydraulic cylinder 14 (or equivalent) is installed in this example between chassis C and platform 10 adjacent, say, the front end 16 of the latter; being controllable by the reversing or four-way valve V to raise either the front or rear ends 16—16' of the said platform 10. Viewing said cylinder 14 as an elongated, longitudinally extensible and contractable device, it may be said to have two terminals 17—17 respectively disposed at the projecting end of the piston rod and at the base of the cylinder casing which serves, of course, for fastening it down in a known manner.

In point of fact, a cylinder 14 may be installed at each side of the present vehicle. Being required to perform the same work at the same time, however, the two would then be coupled in parallel arrangement for this purpose and so made to work in unison. Further reference thereto herein will therefore be confined to only one of them for the sake of simplicity; such reference being understood, nevertheless, to be equally applicable to and also to contemplate the other of them as well.

The container 20 contemplated has shaping (not shown) on its underside to seat on the platform 10 and is also, in this example, of rectangular (hence four-cornered) cross-section in plan with a housing at each of its corners for a leg. For the sake of simplicity and clarity the reference numerals 22 and 23 will refer respectively and generally to each of the four housings and legs; the reference numerals 22f—22r applying to front and rear housing, and the reference numerals 23f and 23r applying to the front and rear legs.

Turning now to FIGS. 1, 3 and 5, it will be seen that the present container 20 is demounted by the simple expedient of operating cylinder 14 (duly connected to a pressure source which is not shown but which may be of any standard type) to rock or tilt platform 10 on its fulcrum 12 to first elevate only the rear end 16', say, of the container 20. Rear legs 23r—23r are then dropped out of their housings 22r—22r to engage the ground below the said elevated container and each is pinned in this position to prevent it from telescoping back into its housing 22r, as in FIG. 19 for example.

When the rear end 16' of container 20 is duly propped as aforesaid, valve V is then operated to reverse cylinder 14 and to rock the container 20 in the other direction, this time elevating the front end 16 whose legs 23f—23f are then also so extended as hereinafter described to complete the propping of the container 20 after which the platform 10 is restored to horizontality; it and the chassis C being then clear of and removable from beneath said container 20.

Obviously, the container 20 is remounted on platform 10 merely by a simple reversal of the procedure above described.

It will thus be seen that the invention, insofar as it has been hitherto broadly described, comprises the several basic structural elements now to be described in greater detail.

That is to say, the platform 10 comprises a pair of collateral elongated beams 30—30 which are connected together in spaced apart, collateral, relation by a pair of spaced braces 32—32 at each end of the platform 10 as well as by other reinforcing devices illustrated, for example in FIG. 8. Each said beam 30 has an inverted substantially channel-shaped lateral cross-section; and, to accommodate fulcrum 12, should be centrally widened preferably with a downwardly pointing peak 31 which may be rounded for a purpose which will appear. In the present example, each pair of braces 32—32 aforesaid is connected by a pair of spaced bearing supports 33—33 mounting means, such as pillow block bearings 34—34, for accommodating rotatable shaft 36 which is co-rotatably threaded through the mid-points of a pair of spaced S-hooks 38—38; said shafts 36—36 being connected by linkage 40 for operation in unison. At least one said shaft 36 has a substantial projection through a said beam 30 which is offset to provide a crank 42 by which all of said S-hooks 38 are thus rotatable in unison to releasably engage pins 44 on the undersurface of container 20 and, simultaneously, to releasably engage stub pins 46 extending theretowards from the chassis C whereby to interlock chassis C, platform 10 and container 20. An externally manipulable bolt 48 is also provided for contemporaneous engagement in bolt holes 49, in a beam 30, and in an upstanding and overlapping part of chassis C which said holes 49 are aligned when the said platform 10 is horizontal; the function of bolt 48 being, of course, to prevent relative movement of the parts which it engages. Ideally, said bolt 48 is associated with said crank 42 so that engagement thereof in at least one of said bolt holes 49 will prevent rotation of shaft 36 and so prevent inadvertent release of the interlock aforesaid.

It need hardly be said that the platform 10 is designed to support a container 20 in a direction and of a size commensurate with that of the chassis C.

The cylinder 14 is installed to bear on one end of platform 10; this being front end 16 in the examples of FIGS. 1, 3 and 5.

As shown in greater detail by the schematic views of FIGS. 2, 4 and 6, the said cylinder 14 is connected to permit introduction of pressure (source not shown) through valve V (selectively), either into chamber 50 on one side or into chamber 52 on the other side of piston 54 to either push up or pull down the specific end of the platform 10 associated therewith; the action being variable by said valve V as previously described.

By balancing the container 20 about its longitudinal centre, and assuming a regular distribution of its contents, it will be seen that the said container 20 and platform 10 on which it is mounted can be rocked or tilted with relative ease—particularly by the ends thereof.

The location of the tilting mechanism at one of such ends is so believed to obviate the need not only for heavy duty mechanism but also for heavy duty construction of the platform 10 such as would be mandatory for example, if the respective locations of the present shaft 12 and cylinder 14 were reversed as in much of the prior art.

Before proceeding with the other basic features of the invention, it is deemed timely at this point to introduce the carriage 60 illustrated, by way of example, in FIG. 17 and herein contemplated as a device for relocating cylinder 14 as well as for concentrating it with the associated pumping equipment which appears only in this view.

The present chassis C includes in its construction a pair of girders or rails 62—62 arranged in collateral, spaced, and reinforced relation being more or less conterminous with platform 10, especially at the rear. Said rails 62—62 respectively carry bearings 63—63 as shown for fulcrum shaft 12; being spaced to permit the rounded platform peaks 31—31 to ride on wear surfaces provided on said rails 62—62 as will be apparent.

Said carriage 60 has plate sidewalls 64—64 which are respectively securable to said chassis rails 62—62 and which may be joined by shelf 66 to form a relatively rigid structure and to support the pumping equipment for the cylinders 14—14.

Said carriage 60 also includes a pair of levers 67—67 which are more or less crank-shaped and, for present purposes, are comparable to a human leg with a knee portion 69, with a top 68 on one side and toe 70 at the other side thereof. Each said lever 67 is rotatably attached to a said sidewall 64 by its said top 68 and its toe 70 is connected to the corresponding part of the opposite lever 67 by roller 71 on which said carriage 60 may roll if necessary.

Between its top and knee portions 68 and 69 each said lever 67 has a projecting trunnion 72, which is connected to one terminal 17 of a cylinder 14 while the other terminal is connected to the platform 10 at a brace 32 for example.

Recalling the hitherto enunciated concept of each cylinder 14 being a longitudinally extensible or contractable device, it will now be seen that when pressure is introduced into cylinder chamber 50—the valve V herein being set as in FIG. 6—said cylinder 14 will extend between its terminals 17—17 as aforesaid and so initially apply a downward thrust to lever 67 as well as an upward thrust to platform 10 substantially as shown in FIG. 18; depressing said roller 71 until it engages the ground, indicated at G in FIG. 18, and thereafter delivering a concentrated upward thrust on rear end 16 of platform 10.

Conversely, when the valve V is reversed (as in FIG. 4) to introduce pressure into cylinder chamber 52, the platform 10 and roller 71 will be drawn towards each other in the direction suggested by FIG. 16.

Under normal load conditions, the contraction of the cylinder 14 will tend firstly to level platform 10 (if necessary) and then to draw up roller 71; the cylinder pressure being discontinued when the said roller 71 has reached neutral position or maximum elevation. However, if desired, the levers 67—67 may be disposed internally of sidewalls 64—64 on which they are journalled being also interconnected near their knees 69—69 by rung 73, and will thus engage and be stopped by knobs 64'—64' at a desired height on said sidewalls 64—64; said knobs 64'—64' projecting inwardly for the purpose.

One of the main advantages provided by the present cylinder carrier 60 is that it may be assembled separately from the vehicle and subsequently installed thereon; making it readily accessible for repairs when necessary or even wholly replaceable in an emergency.

The invention, insofar as it has heretofore been described, therefore contemplates running gear such as a chassis C having a container supporting platform 10 balanced and tiltable on transverse fulcrum 12 carried by said chassis C; tilting mechanism being installed between said chassis C and one end of said platform 10 for tilting said platform 10 either one way or the other on said fulcrum 12.

By these means, the container 20 supported on said platform 10, may thus be elevated at one end of the latter and propped in this position after which the platform 10 may be tilted to raise the other end of the container 20 which may then also be propped; the chassis C being thus rendered separate and removable.

The means visualized by the invention for propping the container 20 may consist of the legs 23 illustrated and shortly to be described in greater detail or they may consist of a loading dock or the ground-based trestles or jacks to be described or they may, in fact, comprise a combination of any two or more of any of the other said means.

Dealing more specifically with the legs heretofore generally identified by the reference numeral 23, these consist of front legs 23f—23f and rear legs 23r—23r which are normally contained in front and rear housings 22f—22f and 22r—22r at the four corners of container 20 in this example.

It should be observed at this point that for reasons which are unimportant herein, many jurisdictions have found it appropriate to enact legislation limiting, in effect, the maximum overall width of a truck or like highway vehicle. Inasmuch as the roadability or road worthiness of many vehicles improves with the lateral span of its specific running gear it is obvious that the truck body—an instant freight container, for example—not only will not usually exceed the width of the running gear but it may conversely, conceivably and logically, be of reduced width relative thereto.

Under such circumstances, it will be understood that, lacking preventative measures, when and if the front legs 23f—23f are dropped to prop the container 20 as aforesaid, they may well obstruct passage of the chassis C either as it leaves or returns to retrieve said container 20.

To meet this contingency each said front legs 23f is laterally extendible, the housing 22f having a cover 75 forming the specific external front corner of the container 20 which is hinged to swing between closed position and open position substantially as shown in FIGS. 13 and 14 and so to expose the entire front leg 23f. Said front leg 23f is, in its turn, slidably encircled by a collar 76 at the end of an integral extension on rail 77 normally contained in a slideway 78 at the lower front end of said container 20 as shown in FIG. 7 from which it is laterally withdrawable as shown in this view and in FIG. 14 to a limited extent sufficient only to locate legs 23f clear of chassis C. Each said leg 23f has a vertical row of peg holes 79 capable of registering with other peg holes 79 in collar 76 for receiving peg 80 by which said leg 23f may be fixed at virtually any functional elevation in said sleeve 76 as indicated in FIG. 19.

The front leg assembly above described also includes means for counterbalancing the gravity of said leg 23f; said means in this example, comprising counterweighting means as suggested by FIG. 7.

When and if legs 23 do not require lateral extension or shifting, the housing 22 therefor need not be openable and in that case each may form a closed sheath for the leg 23 housed thereby.

For example, it is most unlikely that rear legs 23r—23r will ever require lateral extension. In the result, they need only be vertically telescopable into their respective housings 22r—22r at the rear corners of container 20 from which their foot portions always protrude for the sake of accessibility; being equipped with handles 81—81 preferably, to enable them to be withdrawn.

Each said rear leg 23r may also be counterbalanced in much the same way as the front legs 23f.

The propping of containers 20 on legs 23 as discussed, is of great benefit at sites wherein the traffic in containers of the present character is relatively light. Where such traffic is heavy and substantial at forwarding warehouses or at freight yards for example, other facilities may be utilized to perhaps better advantage, notwithstanding the simplicity which attends the operation of the legs.

As one example, a conventional loading dock D such as that pictured in FIG. 15 may have a container supporting rail 82 fixed thereto parallel to and slightly below its surface for engaging and supporting the rear end of a container 20 whose front end may also be supported on legs 23 or on the jacks J illustrated in the same view which are disposed on the respective sides of the approach to the deck D and more or less in transverse alignment with the front end of container 20 when its rear end is engaged on dock rail 82 as aforesaid.

A said jack J comprises a vertical column 85 which may stand upright on base 86 and/or may have a depending dowel portion 87 projecting into a socket 88 in concrete footing 89 imbedded in the ground as shown in FIG. 12. Said column 85 is encircled by a sliding collar 90 which has at least one stub 91 projecting horizontally into said dock approach.

Thereafter when a container 20 stands in said approach with its front end raised by platform 10—its rear end having been engaged on dock rail 82—collars 90—90 may be raised on the jacks columns 85—85 at the respective sides thereof with the stubs 91—91 engaging the container 20 and supporting 20 and supporting it in said elevated position; each collar 90 being fixable on its column 85 by a pin 92 engaged in registering peg holes 93 both in said collar 90 and said column 85; the latter having a vertical row of such peg holes 93 to enable pinning of the collar 90 at any elevation.

As indicated in FIG. 15, it is quite feasible and possible to equip jacks J with dual and oppositely extending stubs 91—91 to permit two or more containers 20 to be parked side by side—assuming the dock D and dock rail 82 to be long enough for the purpose as shown in this view.

Before completing this description of the present invention, some further mention is deemed appropirate concerning the S-hooks 38 and their function.

As will be apparent on reference to FIGS. 8 to 11 inclusive, and as has been previously described, said S-hooks are co-rotatable with shaft 36 which is in turn, rotatable relative to the framework of platform 10.

Figure 10:
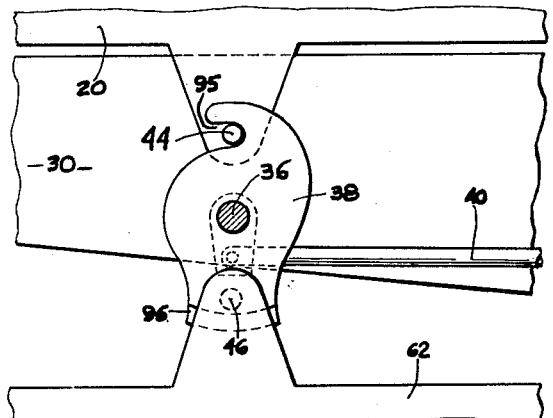
FIG. 10 is an enlargement of a detail of the structure appearing in FIG. 9.
Figure 11:
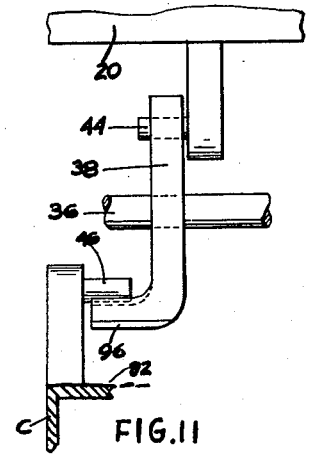
FIG. 11 is an end elevational view of the detail shown in FIG. 10.

As indicated by FIGS. 10 and 11, each S-hook 38 has an upper hook recess 95 which engages a pin 44 integral with container 20. In addition it has a lower offset flange 96 which is capable of being positioned beneath a stub pin 46 on chassis C to cup the latter when S-hook 38 is in its interlocking position.

While these parts have been vertically aligned in the drawing annexed to this description it will be understood that shaft 36 and stub pin 46 for example, may in practice require to be vertically displaced relative to each other to permit unimpeded rocking or tilting of said platform 10.

What I claim is:

1. In combination, a mobile vehicle including an elongated longitudinally extending chassis, an elongated longitudinally extending substantially rectangular platform arranged on top of said chassis, fulcrum means arranged between said chassis and said platform for mounting said platform for tilting movements in either direction from a normal substantially horizontal position and about an axis extending laterally of the central portion of said platform, a demountable freight container including an elongated longitudinally extending substantially rectangular base adapted to be supported on top of said platform, motor means acting between said chassis and said platform for selectively tilting said platform in either direction with respect to its normal position, whereby said platform may first be tilted in a first direction in order to elevate the rear end of said base in its supported position on top of said platform to an elevation well above the plane of the normal position of said platform so as to accommodate the transfer of the support of the rear end of said base from said platform to a first external support, whereby said platform may next be tilted in a second direction in order to elevate the front end of said base in its supported position on top of said platform to an elevation well above the plane of the normal position of said platform so as to accommodate the transfer of the support of the front end of said base from said platform to a second external support, whereby said platform may then be tilted in said first direction and back into its normal position in order to render the support of said container entirely external to said platform so as to accommodate movement of said vehicle from the vicinity of said container thus externally supported, a pair of laterally spaced-apart rear legs carried by said base adjacent to the rear corners thereof, means mounting each of said rear legs for vertical movements with respect to the adjacent rear corner of said base and between contracted and extended positions, and means for restraining each of said rear legs in its extended position, whereby said rear legs in their extended positions constitute the first external support named.

2. In combination, a mobile vehicle including an elongated longitudinally extending chassis, an elongated longitudinally extending substantially rectangular platform arranged on top of said chassis, fulcrum means arranged between said chassis and said platform for mounting said platform for tilting movements in either direction from a normal substantially horizontal position and about an axis extending laterally of the central portion of said platform, a demountable freight container including an elongated longitudinally extending substantially rectangular base adapted to be supported on top of said platform, motor means acting between said chassis and said platform for selectively tilting said platform in either direction with respect to its normal position, whereby said platform may first be tilted in a first direction in order to elevate the rear end of said base in its supported position on top of said platform to an elevation well above the plane of the normal position of said platform so as to accommodate the transfer of the support of the rear end of said base from said platform to a first external support, whereby said platform may next be tilted in a second direction in order to elevate the front end of said base in its supported position on top of said platform to an elevation well above the plane of the normal position of said platform so as to accommodate the transfer of the support of the front end of said base from said platform to a second external support, whereby said platform may then be tilted in said first direction and back into its normal position in order to render the support of said container entirely external to said platform so as to accommodate movement of said vehicle from the vicinity of said container thus externally supported, a pair of laterally spaced-apart front legs carried by said base adjacent to the front corners thereof, means mounting each of said front legs for vertical movements with respect to the adjacent front corner of said base and between contracted and extended positions, and means for restraining each of said front legs in its extended position, whereby said front legs in their extended positions constitute the second external support named.

3. In combination, a mobile vehicle including an elongated longitudinally extending chassis, an elongated longitudinally extending substantially rectangular platform arranged on top of said chassis, fulcrum means arranged between said chassis and said platform for mounting said platform for tilting movements in either direction from a normal substantially horizontal position and about an axis extending laterally of the central portion of said platform, a demountable freight container including an elongated longitudinally extending substantially rectangular base adapted to be supported on top of said platform, motor means acting between said chassis and said platform for selectively tilting said platform in either direction with respect to its normal position, whereby said platform may first be tilted in a first direction in order to elevate the rear end of said base in its supported position on top of said platform to an elevation well above the plane of the normal position of said platform so as to accommodate the transfer of the support of the rear end of said base from said platform to a first external support, whereby said platform may next be tilted in a second direction in order to elevate the front end of said base in its supported position on top of said platform to an elevation well above the plane of the normal position of said platform so as to accommodate the transfer of the support of the front end of said base from said platform to a second external support, whereby said platform may then be tilted in said first direction and back into its normal position in order to render the support of said container entirely external to said platform so as to accommodate movement of said vehicle from the vicinity of said container thus externally supported, a pair of laterally spaced-apart brackets carried by said base respectively adjacent to the front corners thereof and respectively mounted thereupon for lateral movements between inner and outer positions with respect thereto, wherein each of said brackets in its inner position is arranged laterally closely adjacent to the corresponding front corner of said base, and wherein each of said brackets in its outer position is arranged laterally outwardly a substantial distance from the corresponding front corner of said base, a pair of front legs respectively carried by said brackets and respectively mounted thereupon for vertical movements between contracted and extended positions with respect thereto, wherein the foot of each of said front legs in its contracted position is arranged closely adjacent to the bottom of said base, wherein the foot of each of said front legs in its extended position is arranged well below the bottom of said base, and means for restraining each of said front legs in its extended position, whereby said front legs in their extended positions constitute the second external support named.

4. In combination, a mobile vehicle including an elongated longitudinally extending chassis, an elongated longitudinally extending substantially rectangular platform arranged on top of said chassis, fulcrum means arranged between said chassis and said platform for mounting said platform for tilting movements in either direction from a normal substantially horizontal position and about an axis extending laterally of the central portion of said platform, a demountable freight container including an elongated longitudinally extending substantially rectangular base adapted to be supported on top of said platform, and motor means acting between said chassis and said platform for selectively tilting said platform in either direction with respect to its normal position, whereby said platform may first be tilted in a first direction in order to elevate the rear end of said base in its supported position on top of said platform to an elevation well above the plane of the normal position of said platform, a pair of laterally spaced-apart rear legs carried by said base adjacent to the rear corners thereof and mounted thereon for vertical movements with respect thereto between contracted and extended positions, whereby said rear legs may be moved into their extended positions when the rear end of said base occupies its elevated position in order to cause said rear legs to engage the ground, means for restraining said rear legs in their extended positions, whereby said platform may next be tilted in a second direction in order to elevate the front end of said base in its supported position on top of said platform to an elevation well above the plane of the normal position of said platform, a pair of laterally spaced-apart front legs carried by said base adjacent to the front corners thereof and mounted thereon for vertical movements with respect thereto between contracted and extended positions, whereby said front legs may be moved into their extended positions when the front end of said base occupies its elevated position in order to cause said front legs to engage the ground, and means for restraining said front legs in their extended positions, and whereby said platform may then be tilted in said first direction and back into its normal position in order to render the support of said container entirely upon said rear and front legs in their extended positions and independent of said platform so as to accommodate movement of said vehicle from the vicinity of said container thus supported by said rear and front legs in their extended positions.

5. The combination set forth in claim 4, wherein said motor means is arranged to act between the front portion of said chassis and the adjacent front end of said platform.

6. The combination set forth in claim 4, and further comprising a device carried by said chassis and mounted thereon for movements with respect thereto between extended and contracted positions, said device in its extended position being projected below said chassis and into engagement with the external support for said chassis and in its contracted position being lifted below said chassis and from engagement with the external support for said chassis, and means responsive to tilting of said platform out of its normal position and in said first direction for moving said device into its projected position and responsive to tilting of said platform in said second direction and back toward its normal position for moving said device into its contracted position, whereby at least a part of the lifting force exerted upon said platform in tilting the same in said second direction to elevate the front end of said base in its supported position is carried directly by said device in its extended position and thus independently of the wheels normally employed to support said chassis.

7. The combination set forth in claim 4, and further comprising locking mechanism cooperating between said chassis and said platform, said locking mechanism having a lock position restraining said platform in its normal position and an unlock position releasing said platform for tilting movements with respect to its normal position.

8. The combination set forth in claim 4, and further comprising a locking device carried by said platform and cooperating both with said chassis and with said base in its supported position, said locking device having a lock position restraining said platform in its normal position and restraining said base in its supported position and an unlock position releasing said platform for tilting movements with respect to its normal position and releasing said base for movements from its supported position.

References Cited in the file of this patent
UNITED STATES PATENTS

| | | |
|---|---|---|
| 172,609 | Clark | Jan. 24, 1876 |
| 1,122,686 | Clark et al. | Dec. 29, 1914 |
| 1,425,965 | Hocke | Aug. 15, 1922 |
| 1,432,151 | Biggs | Oct. 17, 1922 |
| 2,151,640 | Menning | Mar. 21, 1939 |
| 2,172,244 | Grundler | Sept. 5, 1939 |
| 2,517,304 | Greening | Aug. 1, 1950 |
| 2,665,938 | McCrossen | Jan. 12, 1954 |
| 2,812,873 | Coleman | Nov. 12, 1957 |
| 2,934,373 | Doty | Apr. 26, 1960 |
| 2,963,185 | Jones et al. | Dec. 6, 1960 |
| 3,107,021 | Dempster et al. | Oct. 15, 1963 |

FOREIGN PATENTS

| | | |
|---|---|---|
| 156,962 | Great Britain | Jan. 20, 1921 |
| 418,121 | Germany | Aug. 28, 1925 |
| 700,486 | Great Britain | Dec. 2, 1953 |
| 88,000 | Norway | Sept. 3, 1956 |